United States Patent
Alekseenko

(10) Patent No.: US 11,070,518 B2
(45) Date of Patent: Jul. 20, 2021

(54) METHOD AND SYSTEM FOR ASSIGNING NUMBER FOR ROUTING CALL FROM ELECTRONIC DEVICE

(71) Applicant: YANDEX EUROPE AG, Lucerne (CH)

(72) Inventor: Elizaveta Aleksandrovna Alekseenko, Novosibirsk (RU)

(73) Assignee: YANDEX EUROPE AG, Lucerne (CH)

( * ) Notice: Subject to any disclaimer, the term of this patent is extended or adjusted under 35 U.S.C. 154(b) by 108 days.

(21) Appl. No.: 16/571,906

(22) Filed: Sep. 16, 2019

(65) Prior Publication Data
US 2020/0213271 A1  Jul. 2, 2020

(30) Foreign Application Priority Data

Dec. 26, 2018  (RU) .............................. 2018146456

(51) Int. Cl.
*H04L 29/12* (2006.01)
*G06Q 30/02* (2012.01)

(52) U.S. Cl.
CPC ...... *H04L 61/2061* (2013.01); *H04L 61/2053* (2013.01); *G06Q 30/0251* (2013.01); *H04L 61/605* (2013.01); *H04M 2203/15* (2013.01)

(58) Field of Classification Search
None
See application file for complete search history.

(56) References Cited

U.S. PATENT DOCUMENTS

| 8,699,370 | B2 | 4/2014 | Leung et al. |
| 9,641,680 | B1 | 5/2017 | Wold |
| 2003/0182239 | A1 | 9/2003 | Auzoux |

(Continued)

FOREIGN PATENT DOCUMENTS

| GB | 2490910 A | 11/2012 |
| WO | 2008040010 A2 | 4/2008 |
| WO | 14112989 A1 | 7/2014 |

OTHER PUBLICATIONS

Notice of Allowance with regard to the counterpart U.S. Appl. No. 16/571,931 dated Nov. 14, 2019.

(Continued)

*Primary Examiner* — Antim G Shah
(74) *Attorney, Agent, or Firm* — BCF LLP

(57) ABSTRACT

A computer-implemented method for routing a call from an electronic device to a first target organization. The method, executed by a server, comprises: receiving a request for a first digital content item; generating the first digital content item with an indication of a unique telephone number; and mapping the unique telephone number to the user and the first digital content item. After a predetermined activity time, the unique telephone number is disassociated from the first digital content item and placed into a quarantine pool. After a predetermined quarantine time, the unique number is removed from the quarantine pool and assigned to a second target organization selected by: determining a first business profile associated with the first target organization; determining a second business profile associated with the second target organization; and verifying that the first business profile and the second business profile are different.

16 Claims, 5 Drawing Sheets

(56) References Cited

U.S. PATENT DOCUMENTS

| | | | |
|---|---|---|---|
| 2005/0251445 A1* | 11/2005 | Wong | G06Q 30/0242 |
| | | | 705/14.69 |
| 2007/0294096 A1 | 12/2007 | Randall et al. | |
| 2008/0192736 A1 | 8/2008 | Jabri et al. | |
| 2014/0162597 A1* | 6/2014 | Chau | H04M 15/887 |
| | | | 455/406 |
| 2014/0207588 A1 | 7/2014 | Wong et al. | |
| 2015/0066633 A1 | 3/2015 | Agrawal et al. | |
| 2015/0128162 A1 | 5/2015 | Ionescu et al. | |
| 2016/0027058 A1 | 1/2016 | Saggi | |
| 2016/0100058 A1 | 4/2016 | Nelson et al. | |
| 2017/0178182 A1 | 6/2017 | Kuskey et al. | |

OTHER PUBLICATIONS

English Abstract for EP2608505 retrieved on Espacenet on Sep. 12, 2019.

English Abstract for CN104301548 retrieved on Espacenet on Sep. 12, 2019.

English Abstract for CN102571872 retrieved on Espacenet on Sep. 12, 2019.

* cited by examiner

METHOD AND SYSTEM FOR ASSIGNING NUMBER FOR ROUTING CALL FROM ELECTRONIC DEVICE

CROSS-REFERENCE

The present application claims priority to Russian Patent Application No. 2018146456, filed Dec. 26, 2018, entitled "Method and System for Assigning Number for Routing Call from Electronic Device", the entirety of which is incorporated herein.

FIELD

The present technology relates to routing calls in general and specifically to a method and a system for routing a call from an electronic device to a target organization.

BACKGROUND

To route calls originating from targeted messages, organizations may choose to rent one or more telephone numbers for a limited period of time. Depending on the purpose of use of telephone numbers for the organization, various types of telephone numbers may be rented, such as, for example, standard extension telephone numbers, toll-free telephone numbers, easy-to-remember telephone numbers, or short phone numbers.

When one telephone number is rented out to a first organization and then later is rented to a second organization, there is a period of time during which the customers of the first organization may still be dialing the telephone number hoping to reach the first organization. The telephone number has already been transferred to the second organization, but the customers contact the second organization while trying to reach the first organization. This situation is not only confusing to the customers and both organizations, but may leak the potential customers of the first organization towards the second organization, and even more so, if the first organization and the second organization are competitors in the same or relevant fields.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

It is an object of the present technology to provide improved method and system for assigning numbers for routing call from electronic device.

Embodiments of the present technology have been developed based on developers' appreciation that, when one telephone number is assigned to a first organization for a period of time and later needs to be assigned to a second organization, it is important to verify that the first organization and the second organization are not direct competitors. Although the target audience of the organizations may be similar (for example, adults with purchase power), for example, the services and goods, offered by the organizations, would rather be different. If the first organization and the second organization are not competing, a customer, who has dialed the telephone number after it has been assigned to the second organization, would not be tempted to become a customer of the second organization. For example, a customer who tries to contact a pizza delivery service would not be suddenly interested to buy an office chair from an office furniture store.

In accordance with a first broad aspect of the present technology, there is provided a computer-implemented method for routing a call from an electronic device, associated with a user, to a first target organization. The method is executed by a server coupled to: a digital content display; a content item database comprising a plurality of digital content items; and a telephone number repository hosting: a pool of unique numbers. The method comprises: receiving a request for a first digital content item from the content item database, the first digital content item being destined to the user and not being personalized for the user; generating the first digital content item with an indication of one of the pool of unique numbers; mapping the one of the pool of unique numbers to the user and the first digital content item in order to map the routed call to the first digital item as being a source of the routed call; after a predetermined activity time, disassociating the one of the pool of unique numbers from the first digital content item and placing the one of the pool of unique numbers into a quarantine pool; and after a predetermined quarantine time, removing the one of the pool of unique numbers from the quarantine pool and assigning the one of the pool of unique numbers to a second target organization. The second target organization is selected by: determining a first business profile associated with the first target organization; determining a second business profile associated with the second target organization; and verifying that the first business profile and the second business profile are different with a profile difference being above a predetermined threshold.

In some non-limiting embodiments of the method, the digital content display is one of a user-independent digital content display and a user-specific digital display associated with the electronic device.

In some non-limiting embodiments of the method, the verifying that the first business profile and the second business profile are different with the profile difference being above the predetermined threshold comprises: applying a word embedding to the first business profile to generate a first profile vector; applying the word embedding to the second business profile to generate a second profile vector; and generating a vectorial difference between the first profile vector and the second profile vector to render the profile difference.

In some non-limiting embodiments of the method, the determining the first business profile associated with the first target organization and determining the second business profile associated with the second target organization is based on at least one business profile parameter.

In some non-limiting embodiments of the method, one of the first target organization and the second target organization is a target organization for which the business profile parameter is at least one of: data provided by the target organization during registration; and data associated with the target organization from auxiliary sources. In some non-limiting embodiments of the method, the data from the auxiliary sources comprises data from a landing page of a web site associated with the target organization.

In some non-limiting embodiments of the method, the method further comprises applying a Word2Vec algorithm to generate a vector representation of at least a portion of information contained in the landing page of a web site associated with the target organization.

In some non-limiting embodiments of the method, the data associated with the target organization from the auxiliary sources comprises auxiliary data. The auxiliary data may be at least one of: economic area of at least one activity of the target organization, industry of the at least one activity of the target organization, type of services provided by the target organization, services provided by the target organization, products manufactured, sold or provided by the target organization, type of products manufactured, sold or provided by the target organization. In some non-limiting embodiments of the method, the data associated with the target organization from the auxiliary sources further comprises classification of an activity of the target organization based on the auxiliary data.

In some non-limiting embodiments of the method, at least one of the business profile parameter further comprises a target audience data.

In some non-limiting embodiments of the method, the at least one business profile parameter is one of a plurality of business profile parameters; and the method further comprises: for each business profile parameter, determining a parameter weight based on a parameter weight database; and time passed since placing the one of the pool of unique numbers into the quarantine pool; and wherein determining the first business profile and the second business profile is based on the plurality of business profile parameters and the parameter weights applied to each of the plurality of business profile parameters.

In some non-limiting embodiments of the method, during the quarantine time, the method further comprises checking call traffic to the one of the pool of unique numbers. The checking call traffic to the one of the pool of unique numbers may comprise verifying a call traffic trend during the predetermined quarantine time. The call traffic trend may comprise a frequency of quarantine calls received during the quarantine time, the quarantine calls being destined to the first target organization.

In some non-limiting embodiments of the method, the predetermined quarantine time may be modified based on the frequency of quarantine calls received during the quarantine time.

In some non-limiting embodiments of the method, the method further comprises, during the predetermined quarantine time: determining a first business profile associated with the first target organization; determining a second business profile associated with the second target organization; verifying that the first business profile and the second business profile are different with a profile difference above a predetermined threshold; and based on the profile difference, reducing the predetermined quarantine time.

In accordance with another broad aspect of the present technology, there is provided a system for routing a call from an electronic device, associated with a user, to a first target organization. The system comprises a server coupled to: a digital content display; a content item database comprising a plurality of digital content items; and a telephone number repository hosting: a pool of unique numbers. The server comprises a processor configured to: receive a request for a first digital content item from the content item database, the first digital content item being destined to the user and not being personalized for the user; generate the first digital content item with an indication of one of the pool of unique numbers; map the one of the pool of unique numbers to the user and the first digital content item in order to map the routed call to the first digital item as being a source of the routed call; after a predetermined activity time, disassociate the one of the pool of unique numbers from the first digital content item and place the one of the pool of unique numbers into a quarantine pool; and after a predetermined quarantine time, remove the one of the pool of unique numbers from the quarantine pool and assign the one of the pool of unique numbers to a second target organization. The second target organization is selected by: determining a first business profile associated with the first target organization; determining a second business profile associated with the second target organization; and verifying that the first business profile and the second business profile are different with a profile difference being above a predetermined threshold.

In some non-limiting embodiments of the system, the digital content display is one of a user-independent digital content display and a user-specific digital display associated with the electronic device.

In some non-limiting embodiments of the system, the verifying that the first business profile and the second business profile are different with the profile difference being above the predetermined threshold comprises: applying a word embedding to the first business profile to generate a first profile vector; applying the word embedding to the second business profile to generate a second profile vector; and generating a vectorial difference between the first profile vector and the second profile vector to render the profile difference.

In some non-limiting embodiments of the system, the determining the first business profile associated with the first target organization and determining the second business profile associated with the second target organization is based on at least one business profile parameter.

In some non-limiting embodiments of the system, one of the first target organization and the second target organization is a target organization for which the business profile parameter is at least one of: data provided by the target organization during registration; and data associated with the target organization from auxiliary sources.

In some non-limiting embodiments of the system, the data from the auxiliary sources comprises data from a landing page of a web site associated with the target organization.

In some non-limiting embodiments of the system, the processor is further configured to apply a Word2Vec algorithm to generate a vector representation of at least a portion of information contained in the landing page of a web site associated with the target organization.

In some non-limiting embodiments of the system, the data associated with the target organization from the auxiliary sources comprises auxiliary data, the auxiliary data being at least one of: economic area of at least one activity of the target organization, industry of the at least one activity of the target organization, type of services provided by the target organization, services provided by the target organization, products manufactured, sold or provided by the target organization, type of products manufactured, sold or provided by the target organization.

In some non-limiting embodiments of the system, the data associated with the target organization from the auxiliary sources further comprises classification of an activity of the target organization based on the auxiliary data.

In some non-limiting embodiments of the system, at least one of the business profile parameter further comprises a target audience data.

In some non-limiting embodiments of the system, the at least one business profile parameter is one of a plurality of business profile parameters; and the processor is further configured to: for each business profile parameter, determine a parameter weight based on a parameter weight database; and time passed since placing the one of the pool of unique numbers into the quarantine pool; and wherein determining the first business profile and the second business profile is based on the plurality of business profile parameters and the parameter weights applied to each of the plurality of business profile parameters.

In some non-limiting embodiments of the system, the processor is further configured to, during the quarantine time, check call traffic to the one of the pool of unique numbers.

In some non-limiting embodiments of the system, the checking call traffic to the one of the pool of unique numbers comprises verifying a call traffic trend during the predetermined quarantine time.

In some non-limiting embodiments of the system, the call traffic trend comprises a frequency of quarantine calls received during the quarantine time, the quarantine calls being destined to the first target organization.

In some non-limiting embodiments of the system, the processor is further configured to modify the predetermined quarantine time based on the frequency of quarantine calls received during the quarantine time.

In some non-limiting embodiments of the system, the processor is further configured to, during the predetermined quarantine time: determine a first business profile associated with the first target organization; determine a second business profile associated with the second target organization; verify that the first business profile and the second business profile are different with a profile difference above a predetermined threshold; and based on the profile difference, reduce the predetermined quarantine time.

In accordance with another broad aspect of the present technology, there is provided a computer-implemented method for consecutive associating of a telephone number with a first target organization and with a second target organization when routing a call from an electronic device associated with a user. The method is executed by a server coupled to: a digital content display; a business profile database comprising a first business profile of the first target organization and a second business profile of the second target organization; and a telephone number repository comprising a unique number, the telephone number repository hosting: a pool of unengaged numbers, a pool of associated numbers, and a quarantine pool. The method comprises: associating the unique number with a first organization, the unique number being for inserting into a targeted message associated with the first organization, the targeted message being configured to be displayed on the digital content display; after a predetermined activity time, disassociating the unique number from the first organization and placing the unique number into a quarantine pool; after a predetermined quarantine time, determining a profile difference between the first business profile and the second business profile; and in response to the profile difference being above a predetermined threshold, associating the unique number with the second target organization and placing the unique number into the pool of associated numbers.

In some non-limiting embodiments, the server is further coupled to a content item database comprising a first digital content item and a second digital content item, and the method further comprises transmitting an indication of the unique number with a first digital content item from the content item database to the electronic device for displaying on the digital content display.

In some non-limiting embodiments of the method, the method further comprises: in response to receiving a request from the electronic device to provide the second digital content item for routing the call to the second target organization, transmitting the indication of the unique number with the second digital content item to the electronic device for displaying on the digital content display.

In some non-limiting embodiments of the method, the method further comprises reducing the predetermined quarantine time based on a call traffic to the unique number.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
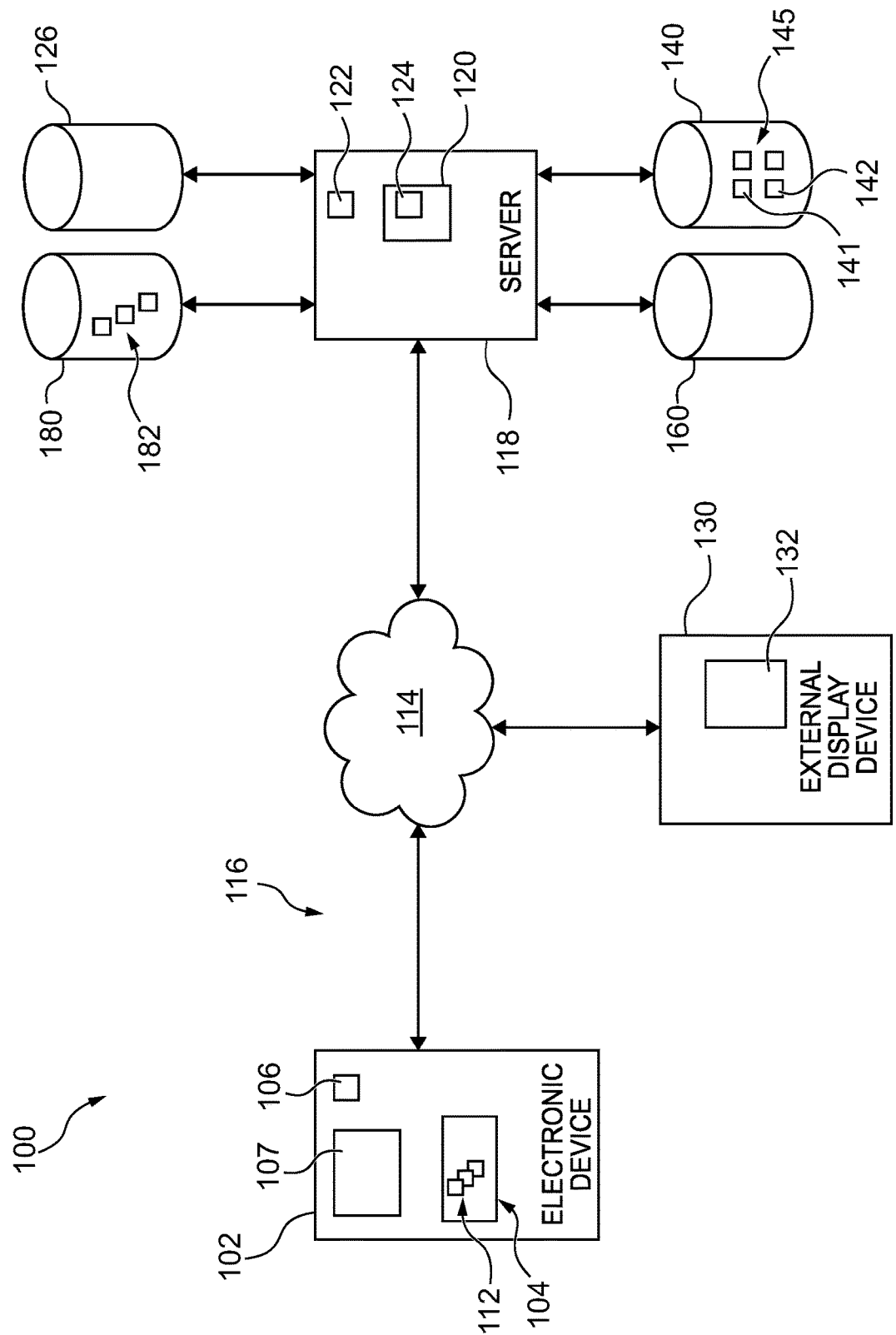
FIG. 1 depicts a schematic diagram of a system implemented in accordance with non-limiting embodiments of the present technology.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION OF THE
NON-LIMITING EMBODIMENTS

Referring to FIG. 1, there is depicted a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, and the like represent various processes which may be substantially represented in computer-readable media and so executed by a computer or processor, whether or not such computer or processor is explicitly shown.

The functions of the various elements shown in the figures, including any functional block labeled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application-specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets.

It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

Referring again to FIG. 1, the electronic device 102 comprises a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 also comprises hardware and/or software and/or firmware (or a combination thereof) to execute one or more service applications 112. Generally speaking, the one or more service applications 112 correspond to electronic applications accessible by the electronic device 102. For example, the one or more service applications 112 may include a web browser application Yandex.Browser™, a news application Yandex.News™, a market application Yandex.Market™, and the like. Needless to say, the one or more service applications 112 may also comprise, for example, social media applications such as Vkontakte™, and music streaming applications such as Spotify™.

In some embodiments, the activities of the user executed on each of the one or more service applications 112 are tracked by one or more associated web servers (not shown), and are used to generate a profile of the user associated with the electronic device 102. In some embodiments, the one or more service applications 112 are configured to store the tracked activities with an indication of the unique user identification. For example, cookies and browsing history may be stored by the one or more service applications 112.

The electronic device 102 further comprises an electronic device display screen 107. The electronic device display screen 107 is a user-specific digital display, meaning that the information displayed on the electronic device display screen 107 is specifically directed or targeted to the user of the electronic device 102.

The electronic device 102 comprises a communication interface (not depicted) for enabling two-way communication with a communication network 114 via a communication link 116. In some non-limiting embodiments of the present technology, the communication network 114 can be implemented as the Internet. In other embodiments of the present technology, the communication network 114 can be implemented differently, such as any wide-area communication network, local area communications network, a private communications network and the like.

How the communication link 116 is implemented is not particularly limited and depends on how the electronic device 102 is implemented. Merely as an example and not as a limitation, in those embodiments of the present technology where the electronic device 102 is implemented as a wireless communication device (such as a smart phone), the communication link 116 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 102, the communication link 116 and the communication network 114 are provided for illustration purposes only. As such, those skilled in the art will easily appreciate other specific implementational details for the electronic device 102, the communication link 116, and the communication network 114. As such, by no means the examples provided herein above are meant to limit the scope of the present technology.

The electronic device 102 has a unique device identifier ("device ID"). In some embodiments of the present technology, this device ID may be detected by the nearby sensors.

With continued reference to FIG. 1, the server 118 is further coupled to an external display device 130. How the external display device 130 is implemented is not limited, and may for example, be implemented as an outdoor advertising structure, such as an electronic billboard placed near a highway or a bus stop, or as an indoor advertising structure, such as an electronic billboard within a metro station or within a store. Such external display device has a digital content display: an external display 132. The external display 132 is a user-independent digital content display.

Depending on the intended use location, the implementation of the external display device 130 will differ. In those non-limiting embodiments where the external display device 130 is implemented indoor, such as in a mall or a store.

The system 100 further includes a server 118 coupled to the communication network 114. The server 118 can be implemented as a computer server. In an example of an embodiment of the present technology, the server 118 can be implemented as a Dell™ PowerEdge™ Server running the Microsoft™ Windows Server™ operating system. Needless to say, the server 118 can be implemented in any other suitable hardware and/or software and/or firmware or a combination thereof. In the depicted non-limiting embodiment of the present technology, the server 118 is a single server. In alternative non-limiting embodiments of the present technology, the functionality of the server 118 may be distributed and may be implemented via multiple servers.

The server 118 comprises a communication interface (not depicted) structured and configured to communicate with various entities (such as the electronic device 102 and other devices potentially coupled to the communication network 114) via the communication network 114. The server 118 comprises a server memory 120 which comprises one or more storage media and generally provides a place to store computer-executable program instructions executable by a server processor 122. By way of example, the server memory 120 may be implemented as a tangible computer-readable storage medium including Read-Only Memory (ROM) and/or Random-Access Memory (RAM). The server memory 120 may also include one or more fixed storage devices in the form of, by way of example, hard disk drives (HDDs), solid-state drives (SSDs), and flash-memory cards.

In accordance with the non-limiting embodiments of the present technology, the server 118 is configured to execute a digital content item selection application 124 (also referred to herein as the "selection application 124"). The selection application 124 is configured to receive requests from and to provide digital content items to the electronic device 102 and the external display device 130. The selection application 124 is also configured to determine whether one telephone number that has been previously assigned to a first organization may be assigned to a second organization. Various routines of the selection application 124, described in detail herein below, are configured to access, update, and search through and extract data from various repositories and databases that will be described now.

Referring again to FIG. 1, the server 118 is communicatively coupled to a digital content item database 126. In alternative embodiments, the digital content item database 126 may be communicatively coupled to the server 118 via the communication network 114. Although the digital content item database 126 is illustrated schematically herein as a single entity, it is contemplated that the digital content item database 126 may be configured in a distributed manner.

The digital content item database 126 is populated with a plurality of digital content items (not separately numbered). The nature of each of the plurality of digital content item is not particularly limited. Broadly speaking, a digital content item may correspond to an advertisement, comprising one or more sentences, images, videos, etc.

The manner in which the digital content item database 126 is populated is not limited. Just as an example the digital content item database 126 may receive the digital content items from one or more advertising organizations, one or more companies, etc.

The server 118 is also communicatively coupled to a business profile database 140. In alternative embodiments, the business profile database 140 may be communicatively coupled to the server 118 via the communication network 114. Although the business profile database 140 is illustrated schematically herein as a single entity, it is contemplated that the business profile database 140 may be configured in a distributed manner.

Figure 2:
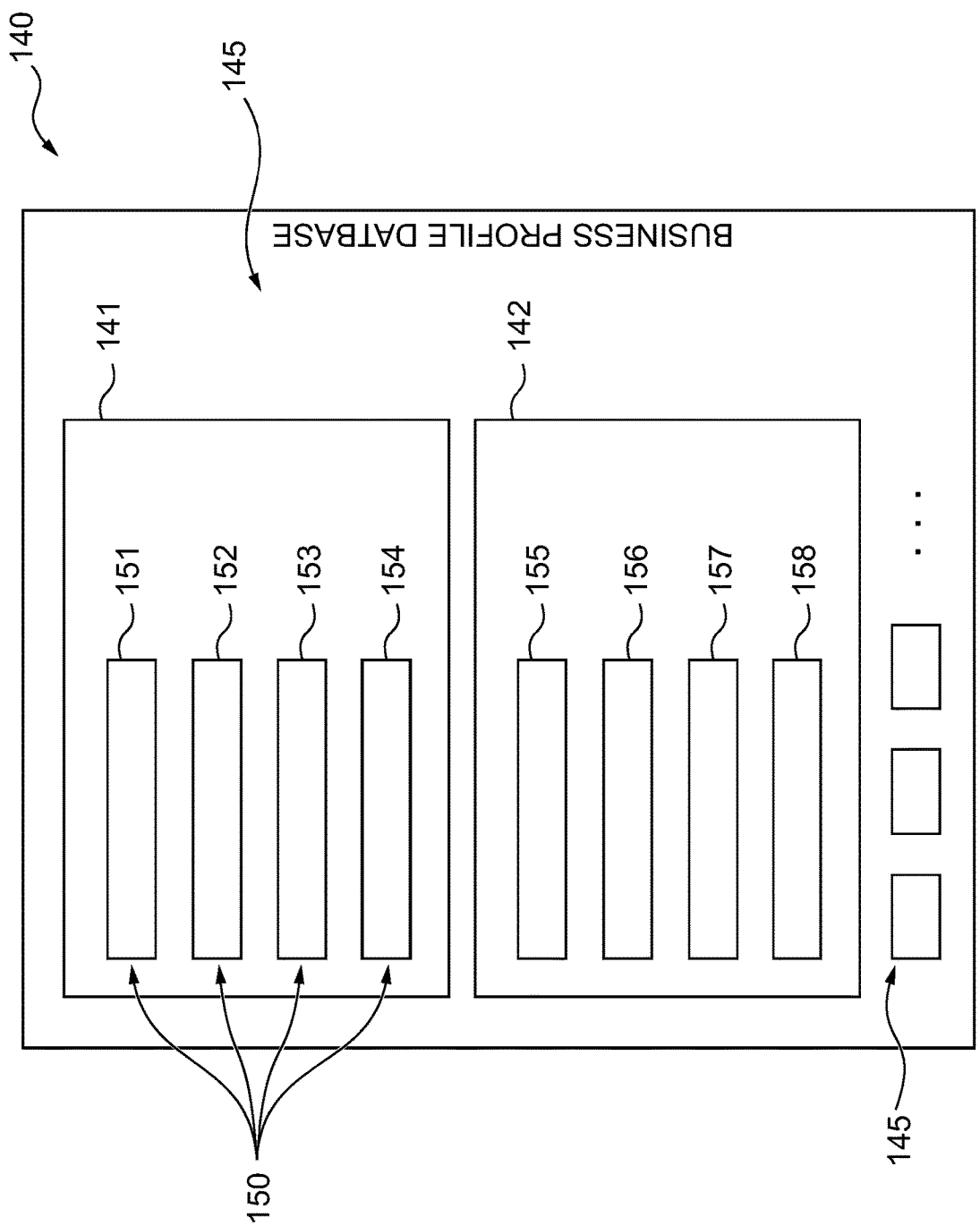
FIG. 2 depicts a schematic illustration of a business profile database implemented in accordance with non-limiting embodiments of the present technology.

FIG. 2 depicts a schematic illustration of the business profile database 140, in accordance with non-limiting embodiments of the present technology. The business profile database 140 is populated with business profiles 145 of target organizations. In at least one non-limiting embodiment, each target organization that may want to use the telephone numbers from a telephone number repository 160, described herein below, is associated with one of the business profiles 145.

As depicted in FIG. 2, each business profile 145 of a given organization (for example a first business profile 141 of a first organization or a second business profile 142 of a second organization) comprises organization identification (ID) 147 and one or more business profile parameters 150. For example, the first business profile 141 of the first organization comprises a first business profile parameter 151, a second business profile parameter 152, a third business profile parameter 153, a fourth business profile parameter 154 of the first organization. The business profile parameters 150 may be based on data provided by the target organization during registration and/or data associated with the target organization from auxiliary sources.

In at least one embodiment, the data provided by the target organization during registration (for example, the first organization's first business profile parameter 151 or a second organization's first business profile parameter 155) may include, for example, a list of terms representing target organization's services and goods. For example, a company selling office furniture may specify that it sells, delivers, and installs pieces of the office furniture, and may also specify that such furniture may be "chairs, office chairs, tables, office tables, bookshelves", and/or the like.

The data associated with the target organization from the auxiliary sources may comprise auxiliary data, such as, for example: economic area of at least one activity of the target organization, industry of the at least one activity of the target organization, type of services provided by the target organization, services provided by the target organization, products manufactured, sold or provided by the target organization, type of products manufactured, sold or provided by the target organization. The auxiliary data may be collected from various auxiliary sources.

For example, the auxiliary data may be collected by the selection application 124 from a classification of an activity of the target organization. As such, the auxiliary data may be collected from a classification database, such as, for example, a database of Standard Industrial Classification, or any other classification of the industry of operation of the target organization.

For example, a typical code "2520" of the standard industrial classification for the office furniture, in accordance with the list of codes of the Standard Industrial Classification, may be provided as a second business profile parameter 152 of the first organization. This coded data may be collected automatically by the selection application by searching (or, for example, crawling through) the corresponding databases of the registered organizations.

In at least one embodiment, the auxiliary data comprises a vector representation of at least a portion of information collected by the selection application 124 from a landing page of a web site associated with the target organization, as described herein below. For example, the third business profile parameter 153 may be such vector representation of the landing page.

In at least one embodiment, the fourth business profile parameter 154 may comprise a target audience data of the first organization. For example, such data regarding the target audience may be provided by the target organization during the registration with the server 118 and/or determined by the selection application 124.

Referring again to FIG. 1, the server 118 is also communicatively coupled to a telephone number repository 160. In alternative embodiments, the telephone number repository 160 may be communicatively coupled to the server 118 via the communication network 114. Although the telephone number repository 160 is illustrated schematically herein as a single entity, it is contemplated that the telephone number repository 160 may be configured in a distributed manner.

When a user is desirous of contacting the target organization by phone, she needs to dial a telephone number. The telephone number may be conveyed to the user along with a digital content item, as an example. The telephone number provided to the user is one of the telephone numbers stored in the telephone number repository 160.

Figure 3:
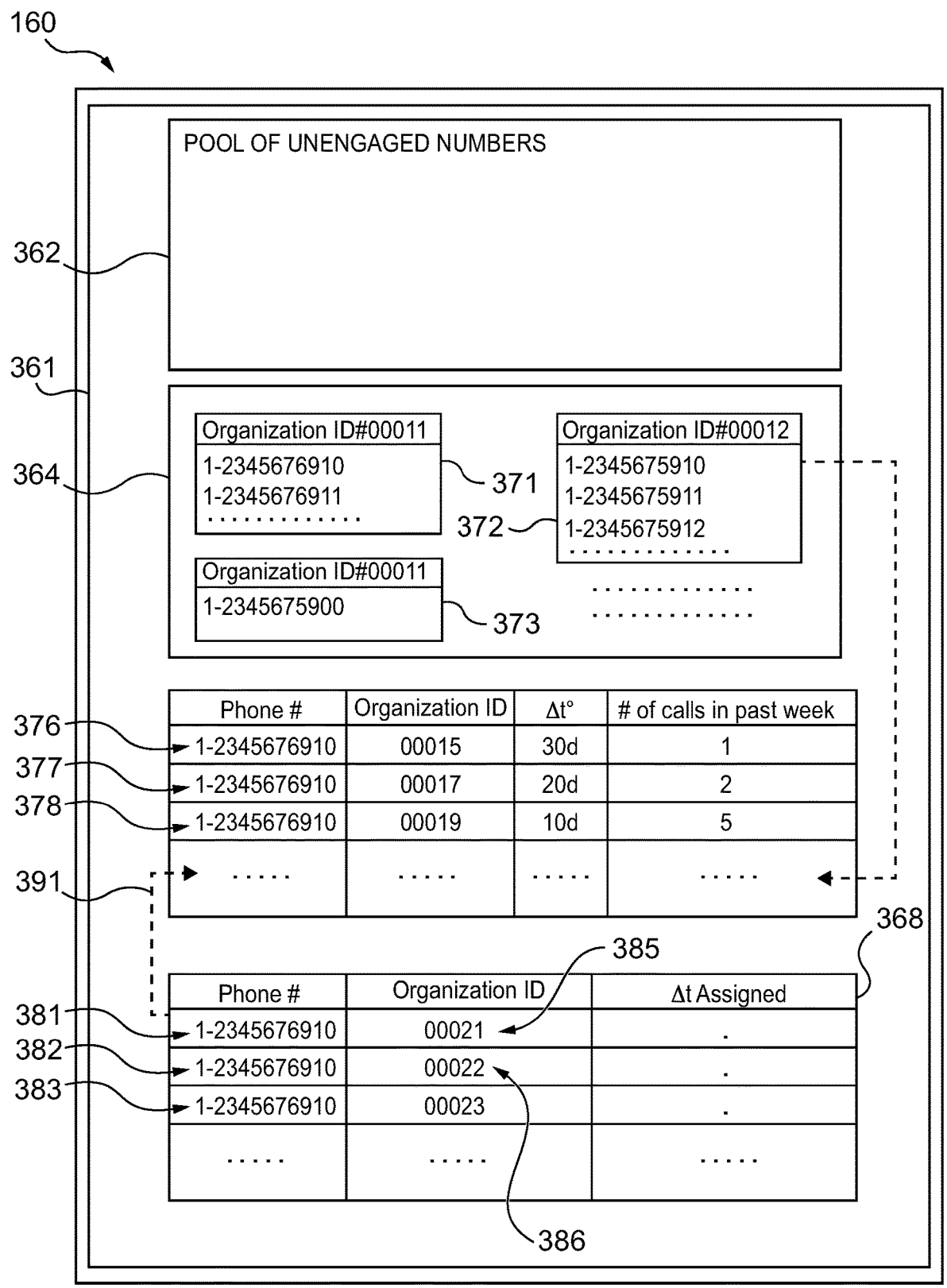
FIG. 3 depicts a schematic illustration of a telephone number repository implemented in accordance with non-limiting embodiments of the present technology.

Referring now to FIG. 3, the telephone number repository 160 comprises a pool of unique telephone numbers 361. The pool of unique telephone numbers 361 comprises a pool of unengaged numbers 362, a pool of reserved numbers 364 (also referred to herein as a "reserved pool"), a pool of quarantined numbers 366 (also referred to herein as a "quarantine pool"), and a pool of associated numbers 368.

The telephone numbers as described herein may be telephone numbers such as full telephone numbers (for example: 1-800-1234567, 1-123-5647890) and short telephone numbers, such as so-called "short numbers" or "short codes" (for example: "12345", "55555").

The pool of unengaged numbers 362 comprises telephone numbers that may be assigned to any target organization. The telephone numbers in the pool of unengaged numbers 362 have been unused long enough to have no call traffic or very limited call traffic, for example, less than one incoming phone call per month.

The reserved pool 364 comprises clusters of telephone numbers (for example, a first reserved number cluster 345, a second reserved number cluster 346, and a third reserved number cluster 347), assigned to target organizations (for example, as depicted in FIG. 3, the first organization with organization ID number "00001", the second organization with organization ID number "00002" and the third organization with organization ID number "00003").

Each cluster of telephone numbers of the reserved pool 364 comprises telephone numbers reserved for use by a single target organization. For example, the first target organization may have the first assigned number cluster 345 reserved, the second target organization may have the second assigned number cluster 346 reserved, the third target organization may have the third assigned number cluster 347 reserved, etc.

All numbers in the reserved pool 364 are reserved to specific target organizations. For example, the target organizations that have the numbers in the reserved pool 364 may pay a fee to have these numbers provided to the customers (users).

In some non-limiting embodiments, when the telephone number is associated with a digital content item and/or a targeted message, the telephone number may be placed into the pool of associated numbers 368. After one of the clusters' telephone number has been used by the customer of the corresponding target organization, the telephone number may return to the pool of reserved numbers 364 to the cluster corresponding to that target organization.

It may occur, however, that the target organization decides to stop paying for one or more phone numbers that have been specifically reserved for it for a reservation period of time. The selection application 124 is configured to place such used phone number into the quarantine pool 366 of the telephone number repository 160.

The quarantined pool 366 is configured to store numbers that have been recently used by one of the target organizations, and that have been recently disassociated from the target organization.

A particular telephone number may be removed from the quarantine pool 366 and transferred into with the reserved pool 364 or the pool of unengaged numbers 362 after the particular telephone number has been dwelling in the pool of quarantined telephone numbers 366 for a full quarantine time period.

The quarantine time period may be predetermined (for example, it may be sixty days, two months, six months, a year, or the like). In some non-limiting embodiments, the full quarantine time period may be adjusted based on whether the telephone number satisfies one or more conditions.

In some non-limiting embodiments, the predetermined quarantine time period may be reduced or extended if the phone number has received less than or more than a predetermined number of phone calls per month, respectively.

As a general rule, each telephone number, before being assigned to a next target organization, needs to dwell in the quarantine pool 366 for the full quarantine time period. However, this is not always possible, because of the shortage of phone numbers and the expense to a provider of the telephone numbers of having the quarantined number blocked for the full quarantine time period without any use.

On the other hand, as described above, confusing situations may occur if a telephone number is being associated with the second organization right after it has been recently disassociated from the first organization. For example, the customer may call the first organization and reach the second organization instead. If the first organization and the second organization are competitors, the customer would become the second organization's customer and therefore the first organization would be financing the advertisement of the second organization.

It should be understood that the quarantine time period may also depend on a type of business of the target organization, for example, a life cycle/sales cycle of the product. Broadly speaking, the life cycle of any given organization can be categorized as either short-term or long-term. The long-term type of organization usually offers services or products that have high price and need a long-term relationship with a customer. For example, the relationship is usually long-term between a target organization, which sells cars, and its clients. It is very probable that the user may note the telephone number and then call the target organization later. Therefore, the quarantine time period should be longer for the telephone numbers disassociated from organizations of such long-term type of organization.

On the other hand, a food delivery service may have a short-term relationship with the customer. For example, the user may look for a new advertisement and would use a new number displayed on the screen of the electronic device 102 or on the external display 132 of the external display device 130. Therefore, the quarantine time period for the telephone number for such short-term type of organization may be much shorter than that of the long-term type of organization.

Thus, the quarantine time period can depend on the type of the most recent organization the telephone number has been associated with.

In at least one embodiment, the telephone number repository 160 may also comprise the data with regards to the organization the telephone number is or has been assigned to.

Referring again to FIG. 3, the quarantine pool 366 may have a first quarantined number 371, a second quarantined number 372, and a third quarantined number 373. In addition to quarantined numbers, the telephone number repository 160 may store information about the previous organization that the phone number has been assigned to, before it has been moved to the quarantine pool 366. In some non-limiting embodiments, data regarding other organizations to which the number has been assigned to earlier may be stored too.

For example, the first quarantined number 371 has been associated with previous organization with organization ID 375 "00004". The second quarantined number 372 has been associated with the second previous organization with the second organization ID 376, etc.

As illustrated in FIG. 3, the telephone number repository 160 may also keep data with regards to time (for example, number of days) passed 378 since placing the quarantined numbers into the quarantined pool 366.

The telephone number repository 160 may also store data with regards to the call traffic to each quarantined number. For example, data with regards to call traffic trend during the predetermined quarantine time which may include the number of calls 379 in a call decay time period (for example, as in the depicted example, the number of calls in the past week), and/or the frequency of quarantine calls received during the quarantine time.

After the quarantined number (for example, the first quarantined number 371) has been in the quarantined pool 366 for the full quarantine time period, it may be moved to the pool of unengaged numbers 362.

The pool of associated numbers 368 comprises telephone numbers that are currently associated with organizations.

Referring to FIG. 3, the pool of associated numbers 368 may comprise, for example, a first associated telephone number 381 which is associated with the fourth organization (having, for example, organization ID "00004"), a second associated telephone number 382 also associated with the fifth organization (having, for example, organization ID "00005"), and the third associated telephone number 383 associated with the sixth organization (having, for example, organization ID "00006").

It should be understood that the telephone number is associated with the target organization when that telephone number is used for routing of the call of a customer who requests the content item in order to be able to connect by phone with the first organization in response to the first organization's advertisement.

After the telephone number has been associated with the target organization for a predetermined activity time 387, it may be disassociated, by the selection application 124, from the first target organization and placed into the quarantine pool 366. For example, the first associated telephone number 381, after it has been associated with the first organization for the predetermined activity time, the first associated telephone number 381 is moved 391 to the quarantine pool 366. As depicted in FIG. 3, the telephone number repository 160 may store the data regarding activity time 387 of each telephone number located in the pool of associated numbers 368.

In some non-limiting embodiments, the reserved pool 364 may be configured to store telephone numbers reserved by the organizations for a long term, while the pool of associated numbers 368 may be configured to store telephone numbers that are associated with the organizations for a short term. For example, the organization may pay for using any available phone number, and each time the digital content item and/or a targeted message is sent with regards to an organization, the new available number is assigned to that organization.

In some non-limiting embodiments, the reserved pool 364 may be part of the pool of associated numbers 368 and the information stored for the telephone numbers in the pool of associated numbers 368, such as activity time, may be stored for the telephone numbers of the reserved pool 364. Thus, the activity time may be the time of association (short-term or long-term) of the telephone number with the organization. The activity time may also be the time of association of the telephone number with the particular targeted message and/or digital content item.

Referring again to FIG. 1, the server 118 is communicatively coupled to a parameter weight database 180. In alternative embodiments, the parameter weight database 180 may be communicatively coupled to the server 118 via the communication network 114. Although the parameter weight database 180 is illustrated schematically herein as a single entity, it is contemplated that the parameter weight database 180 may be configured in a distributed manner.

The parameter weight database 180 is populated with a plurality of parameter weights 182. For example, the first business profile parameter 151, related to the terms representing target organization's services and goods may have a first weight of 0.8; the second business profile parameter 152, related to the code of the Standard Industrial Classification may have a second weight of 0.5. For example, the third business profile parameter 153, related to the vector representation of information from a landing page of the organization's, may have a third weight of 0.7. The fourth business profile parameter 154, related to target audience, may have a forth weight of 0.1. For example, the weight related to the parameter related to the target audience may be lower than any other weight and, the forth weight may be lower than the third weight. For example, the value of parameter weights 182 may vary between −1 and +1.

Figure 4:
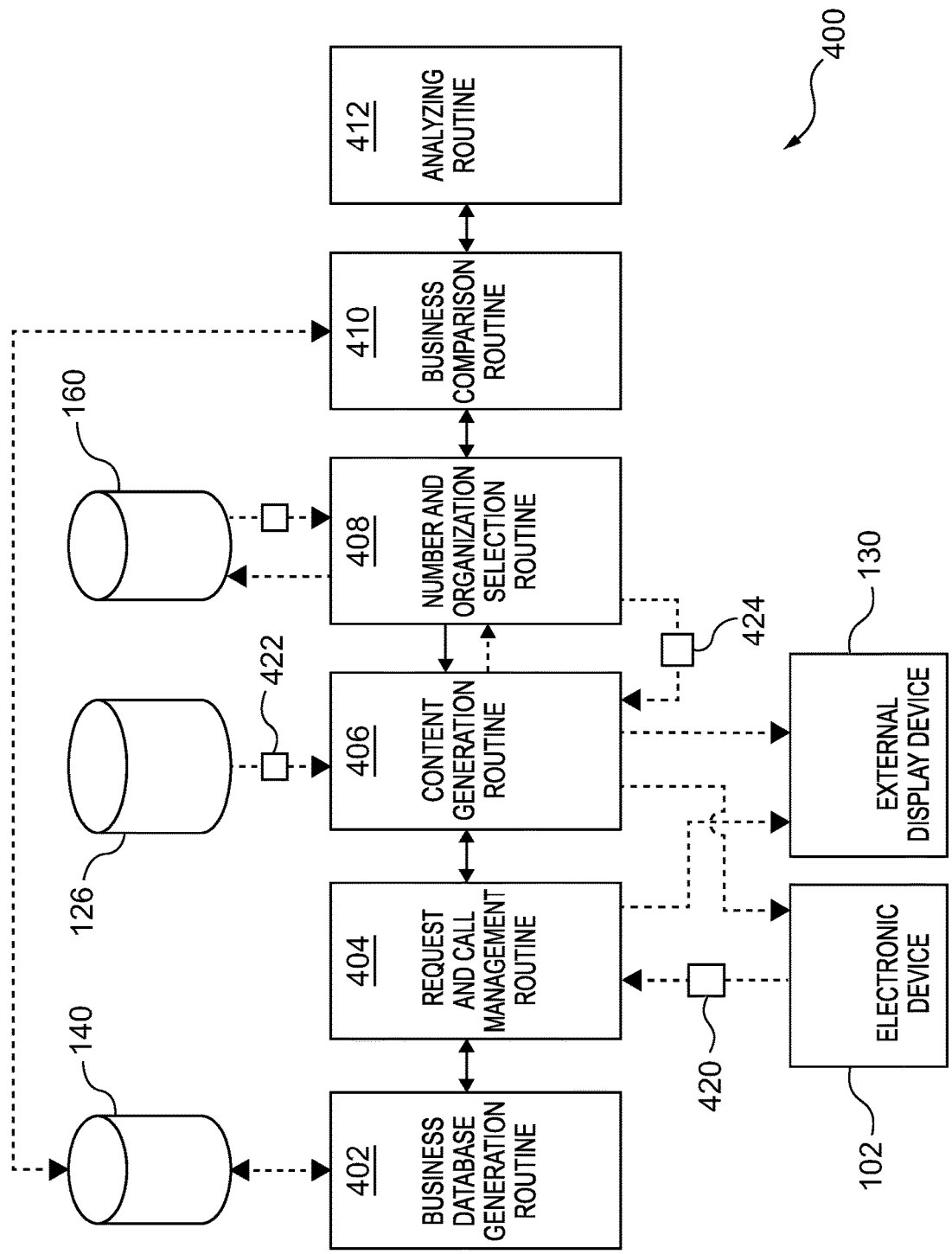
FIG. 4 depicts a schematic illustration of a selection application implemented in accordance with non-limiting embodiments of the present technology.

The manner in which the parameter weight database 180 is populated is not limited. Just as an example the parameter weight database 180 may receive the parameter weights 182 from the selection application 124 and its analyzing routine 412 (FIG. 4). The parameter weight database 180 may be updated by the selection application 124 based on data obtained by the analyzing routine 412.

With reference to FIG. 4, there is depicted a schematic illustration of the selection application 124 being implemented in accordance with non-limiting embodiments of the present technology. The selection application 124 executes (or otherwise has access to): a business database generation routine 402, a request and call management routine 404, a content generation routine 406, a number and organization selection routine 408, a business comparison routine 410, and an analyzing routine 412.

In the context of the present specification, the term "routine" refers to a subset of the computer executable program instructions of the selection application 124 that is executable by the server processor 122 to perform the functions explained below in association with the various routines (the business database generation routine 402, the request and call management routine 404, the content generation routine 406, the number and organization selection routine 408, the business comparison routine 410, and the analyzing routine 412). For the avoidance of any doubt, it should be expressly understood that the business database generation routine 402, the request and call management routine 404, the content generation routine 406, the number and organization selection routine 408, the business comparison routine 410, and the analyzing routine 412 are illustrated schematically herein as separate entities for ease of explanation of the processes executed by the selection application 124. It is contemplated that some or all of the business database generation routine 402, the request and call management routine 404, the content generation routine 406, the number and organization selection routine 408, the business comparison routine 410, and the analyzing routine 412 may be implemented as one or more combined routines.

For ease of understanding the present technology, functionality of each one of the business database generation routine 402, the request and call management routine 404, the content generation routine 406, the number and organization selection routine 408, the business comparison routine 410, and the analyzing routine 412, as well as data and/or information processed or stored therein are described below.

The business database generation routine 402 is configured to generate and update the business profile database 140. As described above, the business profile database 140 comprises business profiles 145 of all the organizations that use the phone numbers or may want to use the phone numbers.

The business database generation routine 402 may collect, from other databases, the information that the target organizations have provided during registration with the server 118. Alternatively, the business database generation routine 402 may itself request each target organization to input such information when the target organization is being registered with the server 118, that is, the business profile database 140 may provide an interface for input of the information.

For example, the business database generation routine 402 may collect and store, in the business profile database 140, the first business profile parameter 151 comprising the list of terms representing target organization's services and goods that has been provided during registration of the target organization with the server 118.

The business database generation routine 402 may also collect the auxiliary data from the auxiliary sources. For example, the business database generation routine 402 may collect auxiliary data by searching (or, for example, crawling through) the corresponding classification databases which store information of registered organizations. For example, the business database generation routine 402 may request the database of Standard Industrial Classification, or any other region-specific classification of the industry of operation of the target organization, to provide information with regards of the target organization. Alternatively, the business database generation routine 402 may crawl through the classification database of Standard Industrial Classification or any other region-specific classification of the industry of operation of the target organization. The business database generation routine 402 may then store the collected one or more codes as the second business profile parameter 152.

The auxiliary data may be collected by the business database generation routine 402 from such auxiliary source as a landing page of a web site associated with the target organization. For example, the business database generation routine 402 may crawl the landing page of a web site associated with the target organization (for example, based on a web address such as the uniform resource locator (URL)). For example, the business database generation routine 402 may analyze the landing page and determine sematic nucleus of the information on the landing page. The business database generation routine 402 may collect the information from the landing page and then apply a Word2Vec algorithm to generate a vector representation of at least a portion of information contained in the landing page of a web site associated with the target organization. The generated vector representation of the landing page of the target organization may then be stored in the business profile database 140, for example, as a third business profile parameter 153.

In at least one embodiment, the business database generation routine 402 may collect and/or determine target audience data. For example, the business database generation routine 402 may request that the target audience data is provided by the target organization. With reference to FIG. 2, the business database generation routine 402 may collect and store, in the business profile database 140, the fourth business profile parameter 154 which comprises the data describing the target audience data of the corresponding organization.

The request and call management routine 404 is configured to receive a request 420 for a digital content item, such that the digital content item is destined to the user, which may or may not be personalized for the user.

The request 420 may be received from the electronic device 102. For example, the user may select the initial digital content item requesting to display contact information of the organization. The electronic device 102 may then send the request to the server 118. The request 420 may also be received by the server 118 from an external display device 130 with the external display 132.

The request and call management routine 404, based on the received request 420, is configured to request the content generation routine 406 to generate the digital content item with an indication of a selected unique number.

The request and call management routine 404 is also configured to map the selected number to the user and the digital content item in order to map the routed call to the first digital item as being a source of the routed call.

The request and call management routine 404 is also configured to assign the quarantined number to the target organization, which has been selected by the number and organization selection routine 408.

The content generation routine 406 is configured to access the digital content item database 126 and to determine a selected digital content item 422 based on the received request 420 in the digital content item database 126.

The content generation routine 406 may then request the number and organization selection routine 408 to provide a selected unique telephone number based on the information about the target organization.

After receiving the selected unique telephone number and/or the indication thereof from the number and organization selection routine 408, the content generation routine 406 is configured to transmit the selected digital content item 422, along with the indication of the selected telephone number 424, to the electronic device 102 and/or external display device 130.

The number and organization selection routine 408 is also configured to disassociate the selected telephone number 424 from the selected digital content item 422 after the predetermined activity time is over. For example, the predetermined activity time may be approximately one minute.

The number and organization selection routine 408 is configured to access and to update the pool of unique telephone numbers 361 in the telephone number repository 160. After it has received a request to provide a selected unique telephone number from the content generation routine 406, the number and organization selection routine 408 is configured to access the pool of unique telephone numbers 361 and to verify whether the cluster of the corresponding target organization has any phone number available. If there is a corresponding cluster, and the corresponding cluster has an available telephone, the available telephone number in the cluster may be selected therefrom.

In the event that there is no cluster which corresponds to the target organization in the pool of reserved numbers 364 (for example, such event may happen if the organization is a short-term relationship organization) or in the event there are no un-assigned numbers in the cluster corresponding to the target organization, the number and organization selection routine 408 verifies whether the pool of unengaged numbers has any available telephone number. If the pool of unengaged numbers 362 includes at least one available number, this available number is selected and an indication of this available number is transmitted back to the content generation routine 406 in order to be transmitted back to the electronic device 102 and/or the external display device 130.

In the event that there are no numbers available in the pool of unengaged numbers 362, the number and organization selection routine 408 is configured to accesses the quarantine pool 366 in order to determine the selected telephone number as described herein below.

As described above, the quarantine pool 366 comprises the telephone numbers that have been disassociated from their corresponding target organizations and which cannot yet be moved to the pool of unengaged numbers 362.

In some embodiments of the present technology, the selected telephone number is determined by comparing the business profiles of the organizations. The number and organization selection routine 408 is configured to determine whether the quarantined number may be assigned to a new organization (also referred to herein as a "next organization"), which is different from the organization the quarantined number has been assigned before it has been quarantined (also referred to herein as a "previous organization").

The quarantined numbers may receive quarantine calls while they are located in the quarantine pool 366.

With reference also to FIG. 3, the number and organization selection routine 408 may first determine whether the selected quarantined number (for example, the first quarantined number 371) has received fewer or more than predetermined threshold number of quarantine calls within the predetermined call-decay time period. For example, the predetermined threshold number of quarantine calls may be three and the predetermined call-decay time period may be a week. As such, the number and organization selection routine 408 may determine whether the selected quarantined number has received less than or more than three calls in the past week.

If the number of phone calls was higher than the predetermined threshold number of quarantine calls, the number and organization selection routine 408 may leave the selected quarantined number (for example, the first quarantined number 371) in the quarantine pool 366 and search for another quarantined number in the quarantined pool 366.

If the number of quarantined calls to the selected quarantined number was less than the predetermined threshold number of calls, the number and organization selection routine 408 may transmit the data associated with the first number to the business comparison routine 410. In some non-limiting embodiments, the number selection routine is configured to transmit the organization ID of the previous organization of the selected quarantined number to the business comparison routine 410.

The number and organization selection routine 408 may select the quarantined number with the longest time of residence ($\Delta t$) in the quarantined pool 366. With reference to FIG. 3, the first quarantined number 371 may be selected by the number and organization selection routine 408 because it has been the longest time period in the quarantined pool (30 days). Then the number and organization selection routine 408 may determine if this first quarantined number 371 has more or fewer than the predetermined threshold of quarantine calls in the past predetermined period. Assuming that the number of calls to the first quarantined number 371 was one in the past week, the number and organization selection routine 408 may select the first quarantined number 371 and transmit its previous organization ID 375 (as illustrated in FIG. 3, "00004") to the business comparison routine 410.

In at least one embodiment, the number and organization selection routine 408 is configured to determine to which next organization the specific quarantined phone number may be assigned. The number and organization selection routine 408 may transmit to the business comparison routine 410 all organization IDs that correspond to previous organizations of all the quarantined numbers in the quarantine pool 366. This way, the business comparison routine 410 may select, from this set of organization IDs the one previous organization of the quarantined numbers that is the least competitive with the organization that needs the telephone number.

It should be understood that the number and organization selection routine 408 may use these criteria in various orders in order to determine whether to select or not the quarantined number and to which target organization the quarantined number may be as signed.

The number and organization selection routine 408 may check, during the quarantine time, traffic to the quarantined numbers. The number and organization selection routine 408 may check, during the predetermined quarantine time, a call traffic trend to the quarantined number. The call traffic trend may be, for example, a frequency of quarantine calls received during the quarantine time when the quarantine calls are destined to the organization to which the quarantined number was previously assigned (previous organization for the quarantined number).

For example, if the traffic to the quarantined number does not exceed the predetermined threshold number of calls within the predetermined call decay period (for example, does not exceed three calls during the past week) the number and organization selection routine 408 may remove the quarantined number from the quarantine pool 366 and place it into the pool of unengaged numbers 362.

In at least one embodiment, the number and organization selection routine 408 may determine that the first business profile and the second business profile are different with a profile difference above a predetermined threshold. In this case, the number and organization selection routine 408 may, based on the profile difference, reduce the predetermined quarantine time.

The number and organization selection routine 408 is also be configured to maintain the pools in the telephone number repository 160, to verify whether the quarantined number has to be removed from the quarantine pool 366 and placed into the pool of unengaged numbers 362.

In at least one embodiment, the number and organization selection routine 408 is configured to associate a unique number with a first organization. The unique number may be destined, for example, for inserting into a targeted message associated with the first organization. Such targeted message may be configured to be displayed on the digital content display (for example, the external display and/or electronic device display screen 107). After a predetermined activity time, the number and organization selection routine 408 is configured to dissociate the unique number from the first organization and place that unique number into the quarantine pool 366.

After the quarantine time period, the number and organization selection routine 408 is configured to request the business comparison routine 410 to compare the first business profile of the first target organization with the second business profile of the second target organization. If the profile difference between the first business profile and the second business profile is above a predetermined threshold, the number and organization selection routine 408 is configured to associate the unique number with the second target organization. The unique number is then placed into the pool of associated numbers 368.

In some embodiments, the quarantine time may be reduced based on a call traffic to the unique number as described herein. The quarantine time may also be reduced based on comparison between the first business profile and the second business profile.

Referring again to FIG. 4, the business comparison routine 410 is configured to compare business profiles of different target organization. For example, the number and organization selection routine 408 may request the business comparison 410 routine 140 to compare the previous organization and one or more potential next organizations for the selected quarantined number.

As discussed above, the non-limiting embodiments of the present technology are based on the premise that when the quarantined number is assigned to the next organization, the next organization is selected such that the next organization is not a direct competitor of the previous organization of the quarantined number. The business comparison routine 410 is configured to verify that the first business profile of the previous organization and the second business profile of the next organization for the quarantined number are different with a profile difference being above a predetermined threshold.

To compare the business profiles of the first organization and the second organization, the business comparison routine 410 may first determine the first business profile associated with the previous target organization (for example, the first target organization) and a second business profile associated with the next target organization (for example, the second target organization). For example, the business comparison routine 410 may access the business profile database 140 to determine the business profiles of the first organization and the second organization.

In at least one embodiment, the business comparison routine 410 may compare each business profile parameter 150 of different organizations. For example, when determining whether the next organization may be the second organization for the quarantined number that had the first organization as the previous organization, the number and organization selection routine 408 may compare the first business profile parameter of the first organization with the first business profile parameter of the second organization.

Referring to abovementioned example of the company selling office furniture and FIG. 2, the business comparison routine 410 may access the business profile database 140 and determine that the first organization's first business profile parameter 151 includes "chairs, office chairs, tables, office tables, bookshelves", and it "sells, delivers, and installs pieces of the office furniture". The second business profile 142 may be related to the organization that sells and delivers food. The second organization's first business profile parameter 155 of the second business profile 142 may include "pizza, pasta, soup, food, beverages, vegetables", and precise that it "cooks, sells, and delivers". The business comparison routine 410 may compare the first business profile parameter 151 of the first business profile 141 with the first business profile parameter 155 of the second business profile 142. For example, the business comparison routine 410 may use Word2Vec algorithm to compare the first organization's first business profile parameter 151 to the second organization's first business profile parameter 155.

Then the number and organization selection routine 408 may compare the first organization's second business profile parameter 152 with the second organization's second business profile parameter 156. The number and organization selection routine 408 may then compare the third business profile parameter 153 of the first organization with the third business profile parameter 157 of the second organization. Then the number and organization selection routine 408 may compare the fourth business profile parameter 154 of the first organization with the fourth business profile parameter 158 of the second organization.

In at least one embodiment, the number and organization selection routine 408 may access the parameter weight database 180 in order to collect corresponding parameter weights for each business profile parameter and apply the corresponding parameter weights to the business profile parameters of the first organization and business profile parameters of the second organization. The number and organization selection routine 408 may then calculate the overall profile difference for first organization and the second organization. The parameter weight may be applied to each of business profile parameters.

For example, the number and organization selection routine 408 may then compare the overall profile difference of these two organizations with a predetermined threshold. For example, the predetermined threshold may be stored in the parameter weight database 180 and/or in one of the databases operatively connected to the server 118.

The business comparison routine 410 may also determine the parameter weight based on the parameter weight database 180 and time passed since placing the quarantined number into the quarantine pool 366.

In at least one embodiment, a word embedding may be applied to the business profiles to generate profile vectors. For example, when comparing the first business profile 141 with the second business profile 142, the word embedding may be applied to the first business profile to generate a first profile vector, and the word embedding may be applied to the second business profile to generate a second profile vector. A vectorial difference may then be generated between the first profile vector and the second profile vector in order to render the profile difference.

If the profile difference between the first organization profile and the second organization profile is higher than the predetermined threshold, then the quarantined phone number, for which the previous organization was the first organization, can be assigned to the second organization. In such event, the business comparison routine 410 is configured to transmit a notification to the number and organization selection routine 408.

If the difference between the first organization profile and the second organization profile is lower than the predetermined threshold, then the quarantined phone number, for which the first organization is the previous organization, cannot be assigned to the second organization. In such event, the business comparison routine 410 is configured to transmit the notification to the number and organization selection routine 408.

As described above, in response to receiving a positive notification from the business comparison routine 410, the number and organization selection routine 408 is configured to remove the selected quarantined number from the quarantine pool 366 and to assign the previously quarantined number to the next target organization.

The analyzing routine 412 is configured to collect and analyze data related to performance of the selection application 124, update parameter weight database 180 based on the analysis of the received calls and requests from the electronic device 102 and external display device 130.

In at least one embodiment, the analyzing routine 412 is configured to collect and analyze statistical data with regards to requests received and calls routed by the selection application 124. The analyzing routine 412 may also be configured to collect and analyze statistical data with regards to quarantine times and target organizations. The analyzing routine 412 may transmit this data to the target organizations' servers (not depicted).

Figure 5:
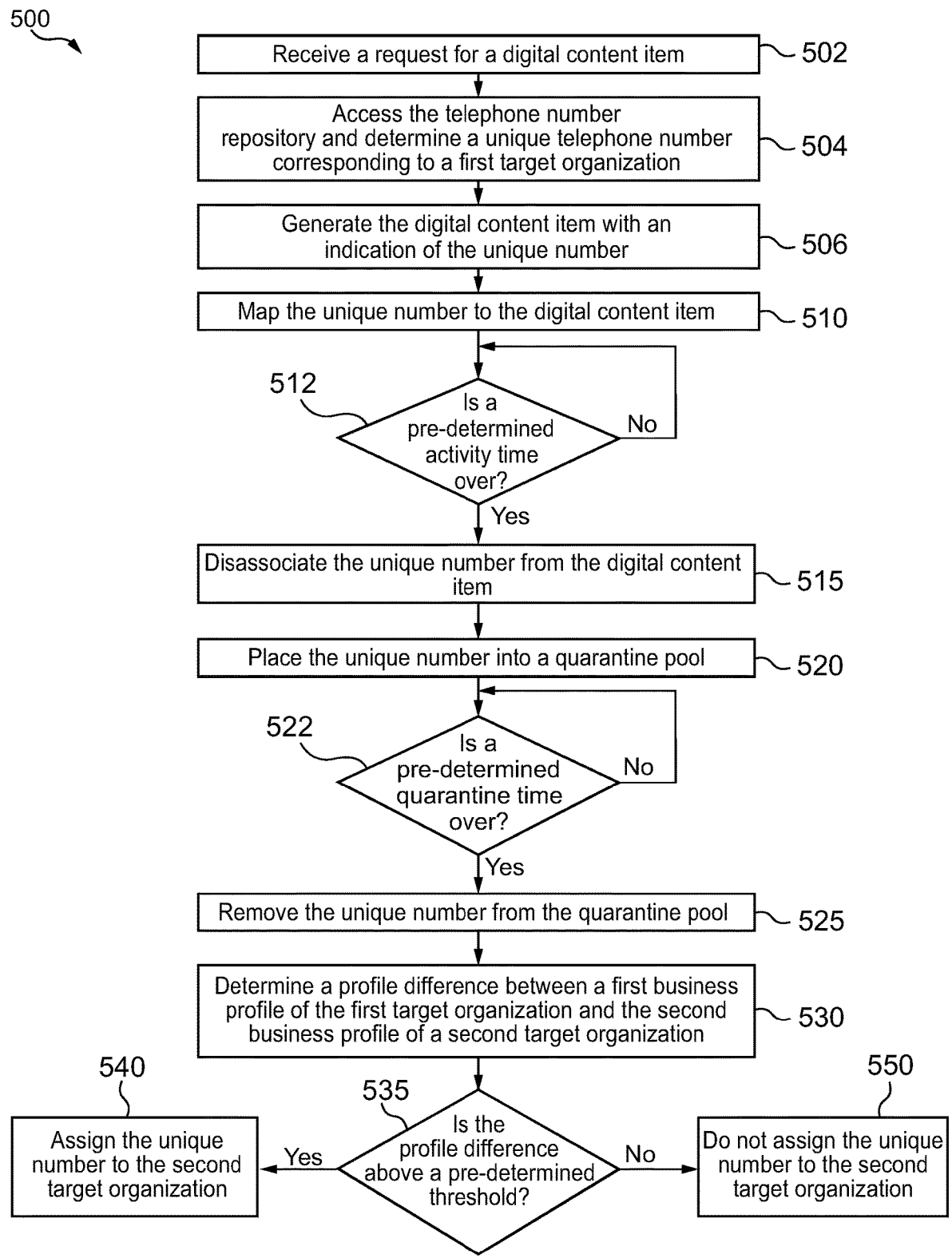
FIG. 5 depicts a computer-implemented method for routing a call from the electronic device to the target organization, in accordance with non-limiting embodiments of the present technology.

FIG. 5 depicts a computer-implemented method 500 for routing a call from the electronic device 102 to the target organization, in accordance with non-limiting embodiments of the present technology. For ease of understanding, the description of the method 500 below also provides references to FIGS. 1-4.

When a user browses the internet (by using a browser application or simply a browser) and visits a webpage related to an organization, such as a service organization, an online store or the like, the browser may provide various digital content items on a user's electronic device. Alternatively, various digital content items of the digital content item database 126 may be provided to users on the external display 132 of the external display device 130, such as a billboard, an in-store display, and the like. For example, the digital content items may provide contact information for the user in case the user wants to contact the target organization.

In order to reach the target organization by phone, the user needs to dial the telephone number. As described above, the telephone number of the organization is not always displayed but is hidden behind an initial digital content item, which may suggest that, if selected, the phone number of the organization will be provided to the user. For example, the initial digital content item may be an image with a telephone or the like. To access the telephone number of the organization, the user needs to click on the initial digital content item which triggers sending a request 420, by the electronic device 102, to the server 118. The request 420 to provide a selected digital content item is transmitted to the server 118.

Referring again to FIG. 5, at step 502 of the method 500, the request 420 for the digital content item is received by the selection application 124. The selected digital content item is configured to be destined to the user and not personalized for the user.

At step 504, the selected digital content item is generated with an indication of one of the pool of the unique numbers (also referred to herein as the selected unique number). It should be understood that the selected unique number may be obtained in accordance with the technology described herein.

At step 510, the selected unique number is mapped to the user and the digital content item in order to map the routed call to the selected digital content item as being a source of the routed call. When the user dials the selected unique number, and the call is routed, the selection application 124 also keeps the mapping of the routed call to the selected digital content item. This may permit to provide statistical data with regards to the call, the target organization to which it was destined. The analyzing routine 412 may analyze such statistics and provide it to the target organizations' servers (not depicted).

In some embodiments, the activity time of the mapping of the routed call to the selected digital content item is predetermined. The predetermined activity time may be adjusted, for example, by the analyzing routine 412. During the activity time, the selected unique number is associated with the digital content item.

After a predetermined activity time has passed 512, at step 515, the selected unique number is disassociated from the first digital content item.

At step 520, the selected unique number is placed in the quarantine pool 366. The quarantine time may be predetermined. For example, the quarantine time may depend on the type of the target organization. The predetermined quarantine time may be modified, for example, based on comparison of business profiles of different target organizations. The predetermined quarantine time may also be modified based on the analysis of the call traffic and call traffic trend which comprises a frequency of quarantine calls received during the quarantine time.

After a predetermined quarantine time has passed 522, at step 525, the selected unique number is removed from the quarantine pool 366.

At step 530, a profile difference between the first business profile of the previous target organization and the second business profile of the second target organization is determined.

The selection application 124 is then configured to verify that the first business profile and the second business profile are different with a profile difference being above a predetermined threshold.

If the profile difference is above a predetermined threshold, at step 540, the selected unique number is assigned to the second target organization. If the profile difference is below the predetermined threshold, at step 550, the unique number is not assigned to the second target organization.

In some embodiments, if the profile difference is below the predetermined threshold, the number and organization selection routine 408 may consider whether any other quarantined number may be used by the second organization. Alternatively, the number and organization selection routine 408 may determine to which organization the selected unique number may be assigned.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer-implemented method for routing a call from an electronic device, associated with a user, to a first target organization, the method being executed by a server coupled to:
    a digital content display;
    a content item database comprising a plurality of digital content items; and
    a telephone number repository hosting:
        a pool of unique numbers;
    the method comprising:
        receiving a request for a first digital content item from the content item database, the first digital content item being destined to the user and not being personalized for the user;
        generating the first digital content item with an indication of one of the pool of unique numbers;
        mapping the one of the pool of unique numbers to the user and the first digital content item in order to map the routed call to the first digital item as being a source of the routed call;
        after a predetermined activity time, disassociating the one of the pool of unique numbers from the first digital content item and placing the one of the pool of unique numbers into a quarantine pool; and
        after a predetermined quarantine time, removing the one of the pool of unique numbers from the quarantine pool and assigning the one of the pool of unique numbers to a second target organization, the second target organization having been selected by:
            determining a first business profile associated with the first target organization based on at least one of a plurality of business profile parameters and the parameter weights applied to the at least one of the plurality of business profile parameters, the at least one business profile parameter being at least one of:
                data provided by the target organization during registration;
                and data associated with the target organization from auxiliary sources,
                wherein for each business profile parameter, the method comprises determining a parameter weight based on:
                    a parameter weight database; and
                    time passed since placing the one of the pool of unique numbers into the quarantine pool;
            determining a second business profile associated with the second target organization based on the at least one business profile parameter and the parameter weights applied to the at least one of the plurality of business profile parameters; and
            verifying that the first business profile and the second business profile are different with a profile difference being above a predetermined threshold.

2. The method of claim 1, wherein the digital content display is one of a user-independent digital content display and a user-specific digital display associated with the electronic device.

3. The method of claim 1, wherein the verifying that the first business profile and the second business profile are different with the profile difference being above the predetermined threshold comprises:
    applying a word embedding to the first business profile to generate a first profile vector;
    applying the word embedding to the second business profile to generate a second profile vector; and
    generating a vectorial difference between the first profile vector and the second profile vector to render the profile difference.

4. The method of claim 1, wherein the data from the auxiliary sources comprises data from a landing page of a web site associated with the target organization.

5. The method of claim 4, wherein the method further comprises applying a Word2Vec algorithm to generate a vector representation of at least a portion of information contained in the landing page of a web site associated with the target organization.

6. The method of claim 1, wherein the data associated with the target organization from the auxiliary sources comprises auxiliary data, the auxiliary data being at least one of:
    economic area of at least one activity of the target organization,
    industry of the at least one activity of the target organization,
    type of services provided by the target organization,
    services provided by the target organization,
    products manufactured, sold or provided by the target organization,
    type of products manufactured, sold or provided by the target organization.

7. The method of claim 6, wherein the data associated with the target organization from the auxiliary sources further comprises classification of an activity of the target organization based on the auxiliary data.

8. The method of claim 1, wherein at least one of the business profile parameter further comprises a target audience data.

9. The method of claim 1, further comprising, during the quarantine time, checking call traffic to the one of the pool of unique numbers.

10. The method of claim 9, wherein the checking call traffic to the one of the pool of unique numbers comprises verifying a call traffic trend during the predetermined quarantine time.

11. The method of claim 10, wherein the call traffic trend comprises a frequency of quarantine calls received during the quarantine time, the quarantine calls being destined to the first target organization.

12. The method of claim 11, further comprising modifying the predetermined quarantine time based on the frequency of quarantine calls received during the quarantine time.

13. The method of claim 1, wherein the method further comprises, during the predetermined quarantine time:
- determining a first business profile associated with the first target organization;
- determining a second business profile associated with the second target organization;
- verifying that the first business profile and the second business profile are different with a profile difference above a predetermined threshold; and
- based on the profile difference, reducing the predetermined quarantine time.

14. A system for routing a call from an electronic device, associated with a user, to a first target organization, the system comprising a server coupled to:
- a digital content display;
- a content item database comprising a plurality of digital content items; and
- a telephone number repository hosting:
  - a pool of unique numbers;
- the server comprising a processor configured to:
  - receive a request for a first digital content item from the content item database, the first digital content item being destined to the user and not being personalized for the user;
  - generate the first digital content item with an indication of one of the pool of unique numbers;
  - map the one of the pool of unique numbers to the user and the first digital content item in order to map the routed call to the first digital item as being a source of the routed call;
  - after a predetermined activity time, disassociate the one of the pool of unique numbers from the first digital content item and place the one of the pool of unique numbers into a quarantine pool; and
  - after a predetermined quarantine time, remove the one of the pool of unique numbers from the quarantine pool and assign the one of the pool of unique numbers to a second target organization, the second target organization having been selected by:
    - determining a first business profile associated with the first target organization based on at least one of a plurality of business profile parameters and the parameter weights applied to the at least one of the plurality of business profile parameters, the at least one business profile parameter being at least one of:
      - data provided by the target organization during registration;
      - and data associated with the target organization from auxiliary sources,
      - wherein for each business profile parameter, the processor is configured to determine a parameter weight based on:
        - a parameter weight database; and
        - time passed since placing the one of the pool of unique numbers into the quarantine pool;
    - determining a second business profile associated with the second target organization based on the at least one business profile parameter and the parameter weights applied to the at least one of the plurality of business profile parameters; and
    - verifying that the first business profile and the second business profile are different with a profile difference being above a predetermined threshold.

15. The system of claim 14, wherein the digital content display is one of a user-independent digital content display and a user-specific digital display associated with the electronic device.

16. The system of claim 14, wherein the verifying that the first business profile and the second business profile are different with the profile difference being above the predetermined threshold comprises:
- applying a word embedding to the first business profile to generate a first profile vector;
- applying the word embedding to the second business profile to generate a second profile vector; and
- generating a vectorial difference between the first profile vector and the second profile vector to render the profile difference.

* * * * *